Dec. 13, 1960   G. K. MURPHY   2,963,988
HIGH CAPACITY PRIVATE COMPARTMENT PASSENGER VEHICLE
Filed Dec. 9, 1958   3 Sheets-Sheet 1

INVENTOR
Goodrich K. Murphy
BY
Wm. R. Glisson
ATTORNEY

Dec. 13, 1960  G. K. MURPHY  2,963,988
HIGH CAPACITY PRIVATE COMPARTMENT PASSENGER VEHICLE
Filed Dec. 9, 1958  3 Sheets-Sheet 3

INVENTOR
Goodrich K. Murphy
BY
Wm. R. Glisson
ATTORNEY

United States Patent Office 2,963,988
Patented Dec. 13, 1960

2,963,988

HIGH CAPACITY PRIVATE COMPARTMENT PASSENGER VEHICLE

Goodrich K. Murphy, New Canaan, Conn., assignor to The Budd Company, Philadelphia, Pa., a corporation of Pennsylvania Filed Dec. 9, 1958, Ser. No. 779,165

2 Claims. (Cl. 105—315)

This invention relates to high capacity private compartment passenger vehicles which provide sitting, standing, sleeping and toilet facilities for each compartment and has for an object the provision of improvements in this art. The present invention is an improvement on the type of accommodation disclosed in my Patents 2,583,960 and 2,808,787.

It is a general object to provide a greater proportion of double-occupancy compartments in a regulation 85 foot car of standard width and height. Whether the double-occupancy compartments are actually sold for double occupancy or single occupancy they are always available for double occupancy, and the space required and construction expense involved are not much more than for a single-occupancy compartment. The available capacity of the car is increased by the present construction with practically the same comfort and convenience as in arrangements of lower capacity.

Another object is to provide multiple-compartment units or modules which have the largest possible proportion of simple transverse partition walls—which are either formed as single-plane walls or are offset in only a single direction—and which have the minimum proportion of more complex partition walls which are offset in two directions to form alcove-boot elements for bed accommodations.

In my copending application, Serial No. 540,300, now Patent No. 2,914,001, Nov. 24, 1959, I have disclosed a three-compartment unit or module in which one of three transverse partition walls is offset to form boot-alcove elements for three bed levels and another transverse partition wall is offset to form boot-alcove elements for at least two bed levels, leaving one of the three transverse walls of simple shape. In the present arrangement there is a two-compartment unit or module having two transverse walls in which one transverse partition wall has offsets for boot-alcove elements to take beds at three levels and the other wall is of simple shape. So while in the three-compartment three-wall unit, two or two-thirds of the transverse walls have a complex boot-alcove shape, in the present two-compartment two-wall unit, one or only half the transverse walls have a complex boot-alcove shape.

In my patents and prior application I have disclosed high-capacity passenger accommodations which provide sitting, standing, sleeping and toilet accommodations in a compartment space which is less than reclining width, being about twice sitting width; which is in part of standing height and in part of less than standing height; and which is in part of reclining length and in part of less than reclining length.

When passenger size is referred to herein it means the size of a normal adult of about six feet height and average proportions, this being the size for which most passenger accommodations are designed. Double sitting width corresponds to the space in a normal railway passenger car between a center aisle wall and a side wall.

In the first-mentioned patent the compartments include bed-space alcoves which project as boots into the adjacent space, the boots being arranged in horizontally staggered disposition. This arrangement has the advantage that all compartment floors are on a common level coinciding with the center aisle floor level but the disadvantage that in some rooms the bed in the use position is located between the standing space and the aisle.

In the second-mentioned patent the boots are arranged in vertically staggered disposition. This has the advantage that in every compartment the bed space is located at the outer wall, leaving free access between the bed and the aisle. Some rooms have a floor level above the aisle floor level but the step height is small and not inconvenient. The beds are on two levels and all the rooms are for single sleeping occupancy.

In the pending application, as stated above, the compartments or rooms are arranged in basic groups, units or modules of three instead of two and on three bed levels instead of two. It provided one double-occupancy compartment in each group of three compartments.

The present invention by a judicious arrangement combines desirable features from all of the other arrangements and provides higher capacity and a greater proportion of double-occupancy compartments and simple partition walls than any of the other arrangements.

It provides all beds at the outside wall side like the second patent; it provides a double-occupancy compartment and a three-bed level arrangement of the pending application but with a smaller proportion of complex partition walls; it has a toilet in each compartment at the aisle wall side; has a basin and mirror in each compartment; has ample bag space in each compartment; and has an extra seat in the double-occupancy compartment.

Up to this point the present invention is related to another copending application, Serial No. 779,184, filed Dec. 9, 1958, which has an arrangement comprising fourteen singles and fourteen doubles to a car to accommodate a total of forty-two passengers. In that arrangement all of the compartments have floors at aisle-floor level or very nearly so. That arrangement has windows at a common level, two of three seats at the outer wall side, one bed with a full-length frame, two beds with part-length frames, one lower bed at a high sitting level from the floor, and a wardrobe for the double-occupancy room.

The present invention, by having the double compartment at a raised floor level, by dividing one lower bed at the middle instead of near the foot end, and by omitting the wardrobe, is adapted to give accommodations for forty-four instead of forty-two passengers, there being sixteen singles and fourteen doubles instead of fourteen singles and fourteen doubles. Moreover the present arrangement provides two full-length bed frames, has all seats at the outer wall side, and has both lower beds at a low sitting height. This is done while leaving practically the same wardrobe, toilet and other facilities for general car use as before.

One compartment, the lower single, has a full-length bed frame which partly slides under the floor of the upper double, somewhat in the manner of the "duplex roomettes" disclosed in patent to Tully 2,364,595, but the overall arrangement of the two-compartment unit is very different from that of this patent. The under-floor bed-stowing arrangement is utilized to avoid having the bed part of the lower stowed vertically behind or in front of the seat and the cumulative gain in longitudinal space obtained thereby largely accounts for the gain of a single room on each side.

The stated and other objects and advantages of the invention will be apparent from the following description of an exemplary embodiment, reference being made to the accompanying drawings, wherein.

Figure 1:
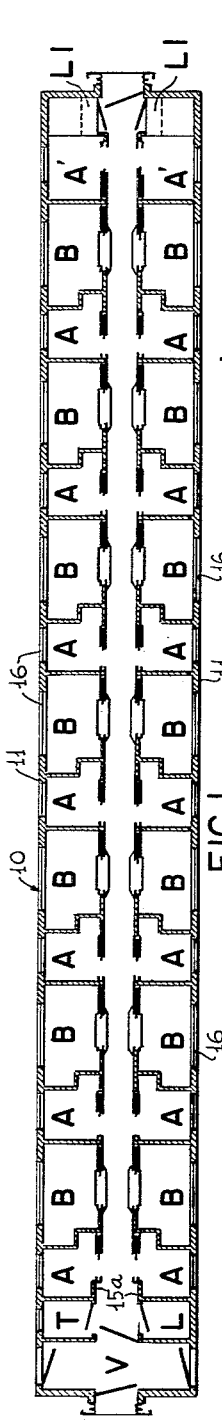
Fig. 1 is a diagrammatic plan view of a standard 85 foot car equipped with the present accommodations.

As shown in the drawings, a railway car 10 has longitudinal outer side walls 11 (one of which is shown), a floor 12, a roof 13, a center aisle 14, aisle walls 15, and windows 16. Between the aisle wall 15 and the side wall 11 on each side there are provided a plurality of transverse partition walls 19 and 20 dividing the space into a plurality of separate passenger compartments A and B, constituting a group unit or module which can be repeated indefinitely. For example, a standard 85 foot railway car will take fourteen such units and two additional single compartments, seven units and another single on each side, which furnish sixteen singles and fourteen doubles to accommodate forty-four passengers in a car, with a general toilet, electric locker, linen lockers, vestibule space, etc., as needed.

Figure 9:
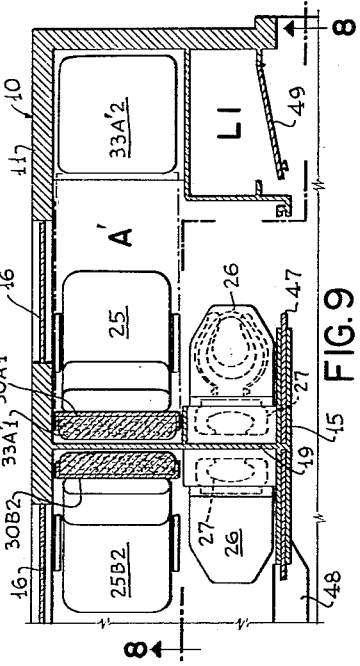
Fig. 9 is a horizontal section and plan view taken on the line 9—9 of Fig. 8.
Figure 10:
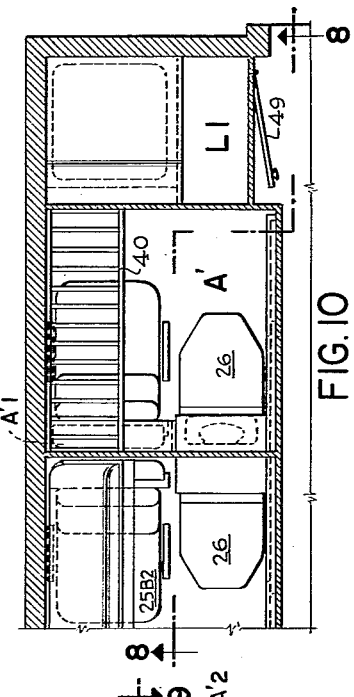
Fig. 10 is a horizontal section and plan view taken on the line 10—10 of Fig. 8.
Figure 8:
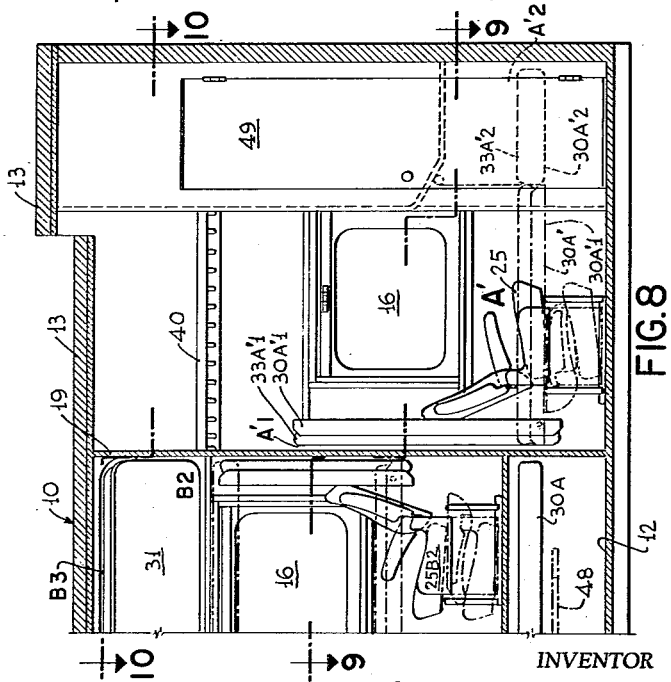
Fig. 8 is a vertical longitudinal section section taken approximately on the line 8—8 of Figs. 1 and 9.

In Fig. 1 the arrangement for a complete car is shown. The normal compartments A and B are shown as occupying most of the length of the car. At the end adjacent the vestibule V there is a general toilet room T and a control equipment locker L. At the other or non-vestibule end there is on each side of the aisle a slightly modified single-occupancy compartment A' and a linen locker L1, as shown in detail in Figs. 8, 9 and 10. At the vestibule end the aisle walls are jogged back at 15a, as shown in Figs. 1, 3, 4, 5, 6 and 7, to provide greater aisle space between the toilet T and equipment locker L.

In each compartment there is arranged on the outer side wall side a folding seat 25, on the inner side a fixed longitudinally facing toilet 26, folding wash basin 27 and above it a mirror, and on the outer wall side in a vertical bed zone a bed 30.

Figure 2:
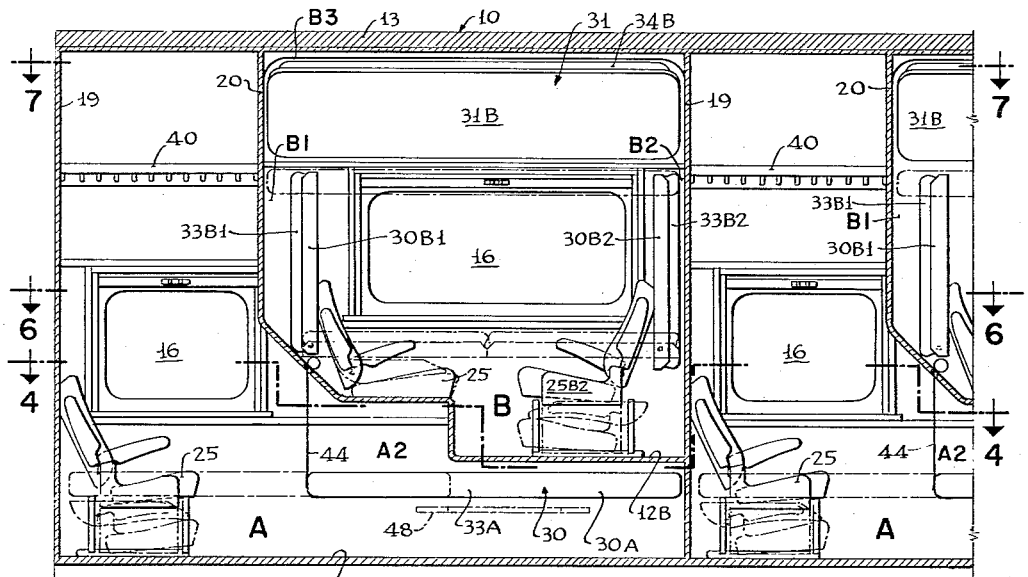
Fig. 2 is a vertical longitudinal section through a portion of one side of the car, the section being taken approximately on the line 2—2 of Figs. 1, 4, 5, 6 and 7.
Figure 3:
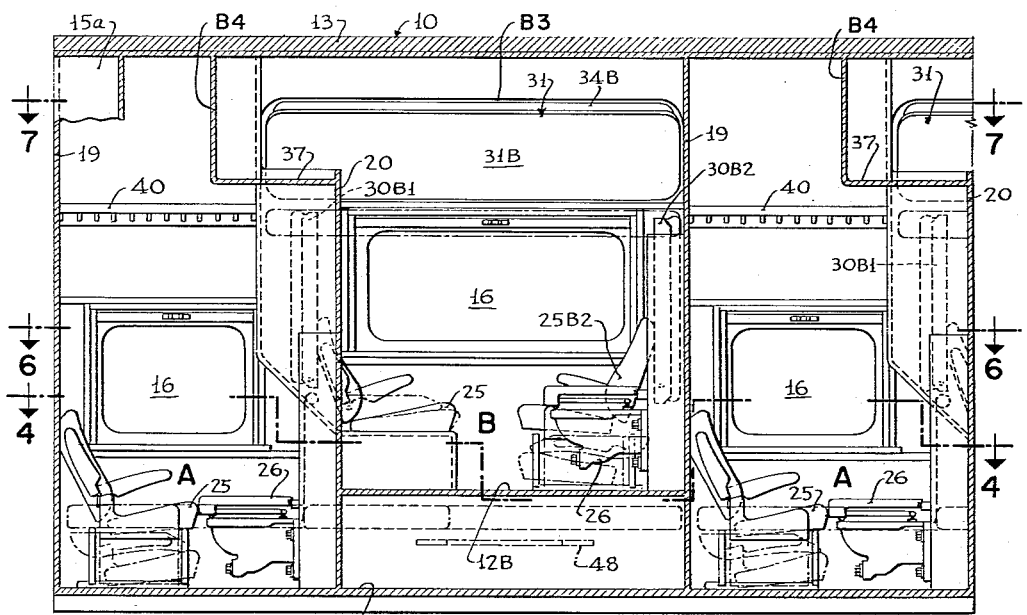
Fig. 3 is a vertical longitudinal section taken approximately on the line 3—3 of Figs. 1, 4, 5, 6 and 7.
Figure 4:
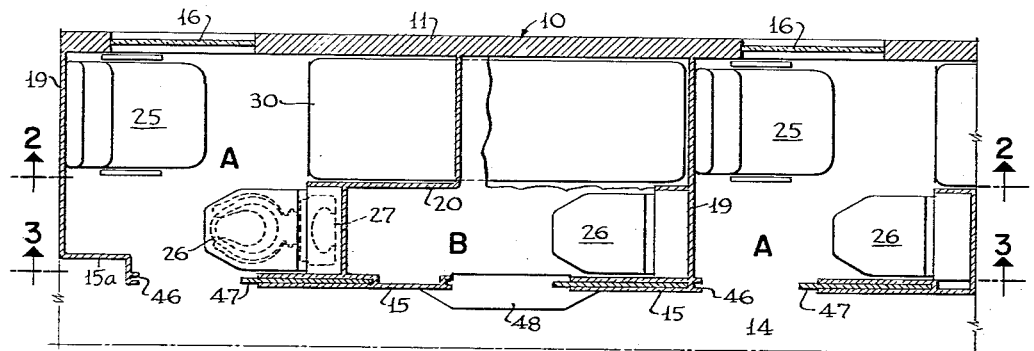
Fig. 4 is a horizontal section and plan view taken on the line 4—4 of Figs. 2 and 3.
Figure 5:
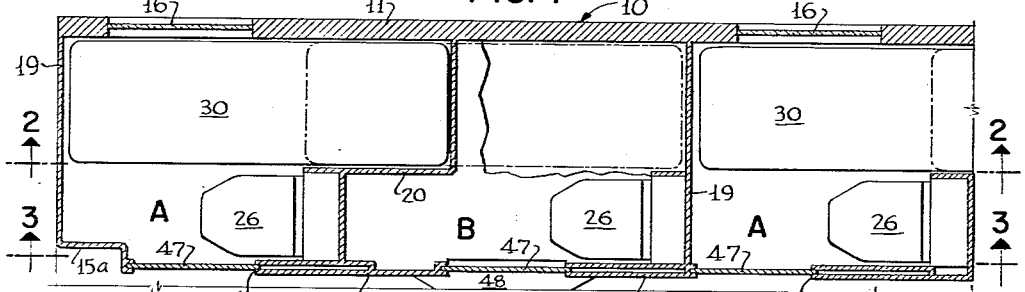
Fig. 5 is a view like Fig. 4 but showing the parts in position for night use.
Figure 6:
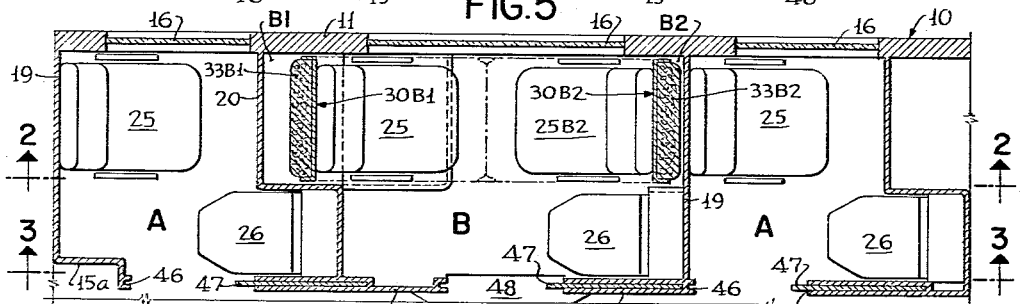
Fig. 6 is a horizontal section and plan view taken on the line 6—6 of Figs. 2 and 3.
Figure 7:
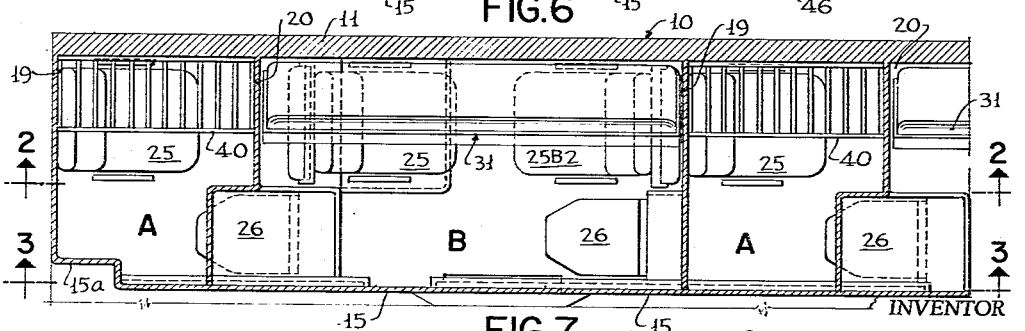
Fig. 7 is a horizontal section and plan view taken on the line 7—7 of Figs. 2 and 3.

In room A there is a full-length bed frame 30A, carrying bedding 33A, which slides on suitable supporting guides between a use position, as shown in Fig. 5 and in chain lines in Figs. 2 and 3, and a stowed position, as shown in Fig. 4, in full lines in Fig. 2 and in broken dash lines in Fig. 3. The floor 12B of compartment B is elevated above the general and aisle floor level by the height of two step risers, as shown in Figs. 3 and 4, and a step 48 is provided to give access to the upper compartment B. A roll curtain 44 is provided to cover the enlarged foot-end boot-alcove A2 for the pillow and extra bedding for bed 33A.

In room B there are two rigid foldable bed frame parts 30B1 and 30B2 which swing down about horizontal transverse axes from a vertical stowed position, as shown in full lines in Fig. 2, to a use position, as shown in chain lines in Fig. 2. These bed parts carry bedding 33B1 and 33B2, respectively, and fold up into alcoves B1 and B2, respectively. Alcove B2 is formed in a cabinet attached to wall 19, which is left plane throughout its extent and alcove B1 is formed by offsetting wall 20 as a boot extending into compartment A well beyond the end of the sliding bed frame 30A when in the stowed position.

In room B there is also an upper bed 31 comprising an edge-hinged frame part 31B with bedding 34B stowable in a side wall and ceiling recess B3. The bed frame 31B is full sleeping length. The alcove B1 extends up full-height to accommodate the upper bed as well as the lower bed. The bed parts 30B1 and 30B2 fold up to occupy space which the upper bed part occupies when lowered into the use position, as shown in Figs. 2 and 3, so the lower bed parts must be lowered before the upper bed part can be lowered. Stated another way, the lower bed can be used at any time but the upper bed cannot be used while the lower bed parts are stowed.

The bed alcove B1 in room B is of sufficient depth to take the bed part 30B1 in stowed position, along with extra bedding, and still allow the main seat 25B to have its back located on a vertical plane extending up from about the outer end of the sliding bed part 30A when stowed. This then provides sufficient space at the outer side wall side for a second seat 25B2.

A bag rack 40 is provided in room A above the window. A shelf 37 on the aisle side of the upper bed zone in compartment B provides bag space for that compartment. The shelf is extended into compartment A above standing height and the space at its end is closed by a boot B4 formed as part of the partition wall 20.

The seat 25 in room A is shown as a known full-folding type which can be lowered sufficiently to be positioned below the bed part 30A in its use position. This seat may be fixed in position but is of the type which is often moved about in the room. It is shown with its back to the wall 19 but it may be moved to have its back disposed at the end of bed part 30A when stowed. The seat 25B2 in room B is similar and may be moved about in the room as space permits.

The toilet seat cover in room B, when folded down, provides a convenient step to assist in using the upper bed 31. Other step elements can be provided above the toilet seat cover, if desired.

Each compartment is provided with an aisle doorway 46 closed by a sliding door 47.

The present arrangement provides an added advantage in that is permits extra long bed space to be obtained for both beds in the upper compartments, a very useful accommodation to have. Whereas, most beds are about 6'2" long, these beds are 6'7½" long, a gain of about six inches.

As brought out above and as shown in the drawings, all of the beds when stowed are disposed in the vertical zone of the upper compartment, leaving the lower compartment, except for its alcove, free of stowed bed parts. Since the double compartment has the necessary floor height, the sliding lower bed can be stowed below it; since the upper compartment has divided intermediate bed parts hinged at their lower ends at a low level near sitting height and with their upper ends, when stowed, disposed in the use-position zone of the upper bed, it is possible to have a full-length intermediate bed; and since the upper bed frame is hinged at a long side above the window at the outer side wall, to stow at the ceiling clear of the upper ends of the stowed intermediate bed parts, it is possible to have an upper bed with a long rigid frame. At the same time the window of the upper compartment is left clear at all times, the upper bed always being above it, and the lower bed parts being below it when in the use position and at the sides of it when in the stowed position.

Compartment A', shown in Figs. 1, 8, 9 and 10, is in general size and disposition like compartment A except that there is not room at the end of the car for a sliding bed so a folding bed part 30A'1 is used in conjunction with a fixed bed part 30A'2 in an alcove A'2. The folding bed part will accommodate the major part of the length of the body. Mattress parts 33A'1 and 33A'2 are provided on the bed parts 30A'1 and 30'A2 respectively. The space above the alcove A'2 and on the aisle side of it is used for a wardrobe L1 having an aisle door 49. The toilet 26 is placed alongside the seat instead of diagonally opposite the seat as in compartment A. In other respects compartment A' is like compartment A.

It is thus seen that the invention provides simple, convenient and economical accommodations for a vehicle, especially a railway passenger vehicle. And while one embodiment has been described for purposes of illustration, it is to be understood that there may be other embodiments within the scope of the invention.

What is claimed is:

1. In a passenger carrying vehicle, in combination; a longitudinally extending outer side wall; a longitudinally extending aisle wall; a plurality of longitudinally spaced transverse partition walls dividing the space between a side wall and an aisle wall into a plurality of passenger occupancy compartments arranged in a group of two compartments adapted for repetition along the length of the vehicle; each compartment being of approximately double sitting width, and the length of a group of two compartments being considerably less than twice a single sleeping length; a floor at aisle floor level for one of said two compartments, adapted for single occupancy; a floor at a height slightly above sitting height above aisle floor level for the other one of said two compartments, adapted for double occupancy; an aisle door for each compartment; an outer wall window for each compartment; a longitudinally facing folding seat at the outer side wall in each compartment; one of said transverse walls being offset longitudinally in a vertical bed zone adjacent the outer side wall to provide a lower bed alcove for bed space in the lower compartment and an upper bed alcove above the lower alcove to provide bed space in the upper compartment; the bed zone alcove space being approximately half the width of the compartments, leaving standing and sitting width space between the bed space and the aisle wall; longitudinally facing toilet facilities in each of said compartments at the aisle wall side and at a transverse wall clear of the beds and available for use at all times; three-level full-length bed accommodations in said compartments, including a full-length rigid-frame lower bed mounted for horizontal sliding movement from a stowed position with one end beneath the floor of the upper compartment to a use position in the lower compartment and its alcove; a full-length rigid-frame upper bed in the double compartment mounted for turning movement about its longer side edge at the outer side wall above the window for movement from a stowed position at the ceiling to a horizontal use position above the window; and an intermediate bed serving as the lower bed in the double compartment, comprising two rigid bed frame parts hinged at their lower ends respectively at each of said transverse walls to swing from a stowed vertical position on opposite sides of the window to a horizontal use position below the window; the intermediate bed parts when stowed having their upper ends disposed in the use-position space of the upper bed; one end of said upper and intermediate beds being disposed in said upper alcove; and all of said beds when stowed being disposed in the vertical zone of said double compartment, leaving the single compartment, except for its alcove, free of stowed bed parts.

2. Passenger compartment accommodations as set forth in claim 1, which further comprises a second folding seat in the upper compartment located at the outer side wall and facing the other folding seat in the compartment, each of said seats in the upper compartment being disposed with a folding bed part behind it and folding down beneath the bed part in its use position.

References Cited in the file of this patent

UNITED STATES PATENTS

| 2,464,749 | Murphy | Mar. 15, 1949 |
| 2,544,980 | Brown | Mar. 13, 1951 |
| 2,556,140 | Lyon | June 5, 1951 |
| 2,600,706 | Tully et al. | June 17, 1952 |
| 2,808,787 | Murphy | Oct. 8, 1957 |